United States Patent Office 3,297,617
Patented Jan. 10, 1967

3,297,617
COATING SLURRY CONTAINING AGGREGATE AND AQUEOUS EMULSION OF PETROLEUM-DERIVED HYDROCARBON RESIN
Joseph Regenstein, Jr., Chicago, and John C. Tapas, Glenview, Ill., assignors to Velsicol Chemical Corporation, Chicago, Ill., a corporation of Illinois
No Drawing. Filed Dec. 23, 1963, Ser. No. 332,842
5 Claims. (Cl. 260—29.6)

This invention relates to sealing and coloring pavements. More particularly this invention relates to a coating composition and a method for its use in sealing and coloring pavements.

It is commonly known that pavements, particularly asphalt pavements, deteriorate with age, traffic loads, and changes in weather conditions. In deteriorating, these pavements often develop potholes and cracks, which allow moisture to seep through the pavement and erode the various subcourses under the pavement, thereby weakening the pavement and shortening its usefulness. Old pavements become brittle and readily chip and flake causing an uneven surface containing shallow potholes which prevent effective draining of moisture from the pavement. Pavements which are used for heavy traffic often develop grooves and the surface takes on a corrugated effect. Perhaps changes in weather conditions is the greatest factor in pavement deterioration. Changes in temperature and humidity, particularly relatively rapid changes, cause the pavement to expand and contract resulting in its buckling, cracking, crazing, and the like. Pavements which have deteriorated or are in the process of deteriorating require considerable maintenance, which most often consists of spot patching cracks and potholes with a variety of patch materials. In the past, repaving of the highway, street, or path was the only method of controlling the deterioration without relying on seasonal and often continuous maintenance.

Recently thin coatings of asphalt and asphaltic materials, either alone or in combination with aggregates, have been developed which seal the cracks and fill the potholes in the pavement thus restoring a smooth surface to the pavement, and eliminating the seasonal and continuous maintenance to a large extent. However, these coatings utilizing asphalt, and asphaltic materials, such as tar and like bituminous mixtures generally have poor ductility, cold temperature stability, feathering properties and the like, and the resulting coatings deteriorate in the same manner as the pavements. Also, when these coatings are applied to existing pavements which are of better construction and are more expensive, such as concrete, the coating often deteriorates at a faster rate than the existing pavement, requiring more extensive maintenance than would have been required without the coating and detracting from the advantages of the better constructed pavement.

In addition, the previously known coatings from asphalt and the like contain bitumens, which from its inherent nature are dark in color, preventing white, light colored, and colored surfaces on the pavements. Thus on dark pavements, such as asphalt pavements, the pavement retained its dark coloring upon coating; whereas on light colored pavements, such as expensive concrete pavements, the coatings resulted in dark surfaces which destroyed the benefit of the light-reflecting, durable light colored surface.

Therefore, it is one object of the present invention to provide a coating composition for sealing pavements and particularly cracks in pavements which does not deteriorate rapidly and results in a colored surface.

It is another object of the present invention to provide a coating composition which is easily applied and results in a ductile, durable, sealed surface, and which has improved properties over asphalt coatings.

Still another object of the present invention is to provide a method for sealing and coloring pavement which is economical, rapid, and provides a durable, ductile, sealed surface.

These and other objects of the present invention will be apparent from the following description:

The composition of the present invention comprises paving aggregate, a solid alkaline material, pigment, water, and an aqueous emulsion of a mixture of hydrocarbon resin and oil, as hereinafter described.

More particularly, the aggregate suitable for use in preparing the composition of the present invention is a paving aggregate whose particles are of a size less than about 10 mesh, and preferably is selected from the group consisting of sand, slag, crushed gravel and mixtures thereof. The term "whose particles are less than about 10 mesh," denotes that the particles pass through a number 10 standard sieve, whose openings are squares having sides 0.0787 inch in length. The alkaline material can be any alkaline filler material commonly used as such in the art, whose particles are less than about 200 mesh, that is, the particles pass through a number 200 standard sieve whose openings are squares having sides 0.0029 inch in length. Especially preferred alkaline materials are Portland cement, hydrated lime, limestone dust and mixtures thereof. Similarly there are a number of various pigments and combinations of pigments whose particles are less than about 200 mesh size which can be used in the composition of the present invention. Among the suitable pigments are: titanium dioxide; lead chromate; lead chromate mixed with various amounts of lead sulfate; copper phthalocyanine; copper phthalocyanine with hydrogen atoms replaced with chlorine atoms; "molybdate orange" composed of lead chromate, lead sulfate and lead molybdate; iron oxide; natural and synthetic iron oxide reds; and the like. While almost any available water can be used in the present composition, it is preferred to utilize clear, potable water.

The essential ingredients of the aqueous emulsion utilized in the composition of the present invention are water and a mixture of substantially non-polymerizable, thermoplastic, light colored hydrocarbon resin produced by polymerization of unsaturated petroleum fractions; and oil selected from the group consisting of aromatic oil, naphthenic oil consisting essentially of a mixture of alicyclic hydrocarbons, and mixtures thereof, said oils being relatively viscous. An emulsifier for the resin and oil mixture is preferably utilized to form a stable resin and oil mixture-in-water emulsion.

In the resin and oil mixture described above, it is preferred to employ a substantially completely polymerized, aromatic, thermoplastic, hydrocarbon resin produced by polymerization of unsaturated petroleum fractions, e.g. by polymerization of "dripolene," a commonly known mixture of unsaturated hydrocarbons obtained in the high temperature pyrolysis of normally gaseous hydrocarbons, the resin having a softening point range of from about 220° to about 300° F., a mixed aniline point of from about 20° to about 60° C., an iodine number of from about 40 to about 160, an acid number of from 0 to about 4, and a molecular weight of from about 600 to about 1700 as determined by cryoscopic means. Hydrocarbon resins of this description and having the properties defined herein can be readily prepared as described in U.S. Patent No. 2,798,866. This patent also defines the term "dripolene."

It is also preferred to use as the oil in the resin and oil mixture described above, oil selected from the group consisting of aromatic oil consisting essentially of a mixture of highly viscous aromatic compounds, having a viscosity of from about 120 to about 300 S.S.U. at 210° F., and an aniline point of from about 20 to about 60° C.; naphthenic oil consisting essentially of a mixture of viscous alicyclic hydrocarbons, having a viscosity of from about 40 to about 200 S.S.U. at 210° F., and an aniline point of from about 50 to about 150° C.; and mixtures thereof; said oils preferably being light in color and relatively viscous. Aromatic and naphthenic oils of this description are commercially available. For example, a suitable aromatic oil is one having a viscosity of about 230–270 S.S.U. at 210° F. and an aniline point of 40–50° C. which is marketed as Penola WS–3267. A naphthenic oil suitable as an ingredient as described herein is one having a viscosity of 80–90 S.S.U. at 210° F., and an aniline point of about 75° C., which is marketed as Circosol 596.

The mixture described above is utilized in the form of an aqueous emulsion. A typical resin-in-water emulsion composition useful as described herein can be readily prepared by heating the resin and oil mixture, until the mixture is almost molten, adding emulsifiers and, if desired, wetting agents, and mixing with water until an emulsion is formed.

The emulsifiers and wetting agents useful to form the aqueous emulsions are surface active materials of the cationic, anionic and nonionic types. Use of anionic and nonionic emulsifiers and anionic-nonionic emulsifier pairs are preferred to obtain rapid emulsions of excellent stability. Typical examples of such surface-active materials are sodium stearate, morpholine oleate, sodium lauryl sulfate, sodium 2-ethylhexyl sulfate, sodium 2-ethylhexanol-1 sulfate, sodium 7-ethyl-2-methyl-undecanol-4 sulfate, sodium naphthalene sulfonate, sodium alkylnaphthalenesulfonate, sodium oleic acid sulfonate, sodium castor oil sulfonate, glycerol monostearate containing a soap (or a sodium fatty alcohol sulfate), polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polyoxypropylene glycol fatty acid esters, polyoxypropylene modified fatty acid esters, polyoxypropylene-polyol fatty acid esters, polyol fatty acid monoesters, di- and higher polyhydric alcohol fatty acid esters, cholesterol and other fatty acid esters, lanolin, oxidized fatty oils, alkylated aryl polyether alcohols such as the condensation product of diamylphenol with ethylene oxide, and the like.

In preparing the composition of the present invention a major proportion of suitable aggregate is used with minor proportions of solid alkaline material, pigment, water and emulsion. It is preferred that an emulsion comprising a mixture of from about 30 to about 70 parts by weight of the described resin and from about 30 to about 70 parts by weight of the heretofore described oil, with an emulsifying quantity of emulsifier and from about 15 to about 75 percent by weight water based on the weight of the resin and viscous oil mixture and emulsifier, be used as the emulsion ingredient.

In a preferred embodiment of the invention, the composition is comprised of from about 140 to about 190 parts by weight of the described aggregate; from about 1 to about 20 parts by weight solid alkaline material; from about 2 to about 10 parts by weight pigment; from about 2 to about 25 parts by weight water; and from about 10 to about 40 parts by weight of an emulsion comprising from about 45 to about 70 parts by weight of a mixture comprising from about 30 to about 70 percent by weight of the preferred resin and from about 30 to about 70 percent by weight of the described oil, from about 2 to about 10 parts by weight of the emulsifier for the resin and oil mixture, and from about 20 to about 50 parts by weight water.

The composition of the present invention can be readily improved by incorporating rubbers into the resin and oil mixture in the emulsion. The natural or synthetic hydrocarbon rubbers, such as butadiene-styrene copolymer, polyisoprene, polybutadiene, polyisobutylene, and their mixtures, and the like, are suitable for this purpose. The addition of rubber has been found to improve certain properties of the resulting coating, such as ductility, especially cold weather ductility, wear and stability. The rubber additives are most easily usable in the form of crumbs, pellets, beads, etc. to facilitate dissolution into the resin and oil solution or in the form of an emulsion or rubber latex added to the emulsion of the resin and oil mixture. To effect this improvement in the composition, it has been found satisfactory to add from about 1 to about 10 parts by weight of the hydrocarbon rubber to the resin and oil mixture or in the rubber emulsion or latex, heretofore described, and thus the rubber normally is present in an amount of from about 1 to about 10 percent based on the weight of the said oil and resin mixture.

The composition of the present invention can be readily prepared, by first preparing the resin and oil mixture, then preparing the emulsion of the mixture and then preparing the desired composition therewith. The resin and oil mixture can be prepared by blending a heated mixture of the synthetic thermoplastic hydrocarbon resin and an oil selected from the group consisting of aromatic oil, naphthenic oil, and mixtures thereof.

Thus, for example, the resin comprising about 30 to about 70 parts by weight of the mixture is added to the previously specified oil comprising from about 30 to about 70 parts by weight of the mixture, and heated with stirring until the resin is dissolved. Alternatively, the resin can be heated until molten and added to the oil in that condition. The preparation can also be readily carried out in a convenient quantity of aromatic solvent at lower blending temperatures. The amount of solvent is not critical, and an example of a convenient quantity of solvent is an amount of aromatic solvent equal in weight to the weight of the resin and oil mixture. Exemplary of the suitable solvents are benzene, toluene, xylene, and mixtures of these or any other aromatic solvents.

If the mixture is prepared without a solvent, the oil is heated to a temperature of between about 200° and 320° F., and the rubber if used, and resin blended therein preferably under a blanket of inert gas such as carbon dioxide or nitrogen.

If a solvent is used, the oil can be added to the solvent before or at the same time the synthetic hydrocarbon resin is added. The addition is conveniently performed at atmospheric pressure and at a temperature of between about 100° and 260° F. with vigorous stirring until the resin has dissolved into the solution. To improve the composition, it is preferred to add from about 1 to about 10 parts by weight of a hydrocarbon rubber as aforesaid to the solvent before the resin and oil are added. The rubber is added to the solvent at a solvent temperature of between about 100° and 260° F. and stirred for several hours until the viscosity of the rubber-solvent solution remains constant.

After the resin and oil have been added and dissolved into solution, the solvent or solvent mixture is removed by stripping in vacuo or by any other solvent removing process. The stripping is readily performed at atmospheric pressure at the boiling point of the solvent or solvent mixture or at lower temperatures if reduced pressure is used.

As heretofore described, the resin and oil, and rubber if used, mixture is utilized in the form of an aqueous emulsion. This emulsion can be readily prepared by heating the mixture until it is almost molten, adding the emulsifier, and, if desired, wetting agents thereto, and mixing with water until an emulsion is formed. At first a water-in-resin and oil mixture emulsion is formed, which can be slowly mixed through an inversion period to yield a concentrated resin and oil mixture-in-water emulsion. This emulsion can be further diluted with water to any desired concentration. The temperature at which the emulsion is prepared is dependent upon the softening point of the resin and oil mixture and will vary from about 125° to about 200° F., with the lower temperatures being used with lower softening point mixtures and the higher temperatures with higher softening point mixtures.

Where rubber is to be added to the emulsion described above in the form of an emulsion or a latex to improve the composition, suitable rubber emulsions and latexes for this purpose are readily available commercially. Exemplary of these suitable materials are centrifuged natural rubber emulsion, natural rubber latex, styrene-butadiene emulsion, butyl rubber emulsion, and the like.

In a preferred embodiment of the present invention, the coating composition is in the form of a slurry of the aggregate, alkaline material, pigment, and emulsion in water. This slurry can be readily prepared by placing the aggregate, alkaline material and pigment in a batch mixer, such as the mixing devices common to the road paving and coating arts, such as a cement or plaster mixer, to thoroughly mix these ingredients. The water is then added to the mixer, and mixing is continued until the mixture is uniform. The emulsion ingredient is added to the mixture, which is mixed until a slurry is formed. Additional water can be added, if required, to increase the fluidity of the slurry.

The coating composition described above can also be readily prepared in continuous mixing devices, such as the mixing section of the Young Slurry Machine, marketed by Slurry Seal, Inc., Waco, Texas, U.S.A., by adding the above ingredients in the proper proportions to the mixing chamber.

The method of the present invention comprises applying the aforesaid composition to pavement. The composition of the present invention can be applied to pavements in various manners readily recognizable to the art. For example, the simplest manner of applying the composition is to dump the composition on the pavement and then spread it to a desired thickness by the use of trowels. A more efficient manner of application is to feed the composition into a spreader box, which is then dragged along the pavement, spreading the composition at an even depth across the pavement. Other devices commonly used in the art can be used to apply the composition described herein. It is preferred to apply from about 1/16 to about 1 inch, and even more preferred to apply from about 1/16 to about 1/2 inch, in depth, of the coating composition of the present invention.

The following examples illustrate the preparation of the compositions of the present invention and their application to pavements. Although certain specified ingredients are used in these examples, the invention is not limited thereto, and other ingredients within the scope of the above description can be substituted therefor.

EXAMPLE 1

*Preparation of resin and oil mixture*

Aromatic oil (18 parts) consisting essentially of a mixture of highly viscous aromatic compounds and having a viscosity of 262 S.S.U. at 210° F. and an aniline point of 46° C., and naphthenic oil (18 parts) consisting essentially of a mixture of viscous cycloparaffinic compounds and having a viscosity of 89 S.S.U. at 210° F. and an aniline point of 75° C., are blended and slowly heated to 220°–240° F. Crumb styrene-butadiene rubber (4 parts) having a Mooney viscosity ML 4 min. at 212° F. of 0.046–0.054 inch, which can be purchased as Ameripol 1006, is added to the oils and stirred until the rubber dissolved therein. The blending apparatus is flushed with carbon dioxide gas and stirring is continued for about 16 hours under a blanket of the gas. To this solution is added crushed substantially completely polymerized synthetic aromatic thermoplastic hydrocarbon resin, softening point 238° F. (60 parts) having a mixed aniline point of 31.6° C., an iodine number of 125, an acid number of 0, and a molecular weight range of 800–1200 as determined by cryoscopic means. Stirring is continued for an additional hour, at which time the resin is dissolved into solution. The resulting mixture is a resin and oil mixture suitabel for use in preparing the compositions of the present invention. The resin employed in this and similar examples can be prepared as described in U.S. Patent No. 2,798,866.

EXAMPLE 2

*Preparation of an emulsion of resin and oil mixture*

Product of Example 1 (2000 grams) was stirred with a laboratory mechanical stirrer set at its slowest rate of speed. The product was slowly heated to, and thereafter maintained at 190°–200° F. A nonionic surfactant, nonyl phenoxy polyoxyethylene ethanol (149 grams), and the sodium salt of an alkyl aryl polyether sulfonate (50 grams) were added into the heated mixture until a uniform mixture was obtained. Water (1381 grams) was slowly added at the temperature of the mixture with stirring. A water-in-resin and oil mixture emulsion was first formed which inverted to a resin and oil mixture-in-water emulsion as indicated by the change from a doughy to milky consistency. After all the water had been added, the emulsion thus formed had a viscosity of 53 Kreb units, a solids content of 60.8% by weight, a density of 8.4 pounds per gallon and a pH of 7.3. This emulsion also had the following properties as determined by ASTM Method D–244–60 and AASHO Method T–59:

| | |
|---|---|
| Furol viscosity at 77° F., seconds | 40.0 |
| Settlement, 5 days, percent | .75 |
| Residue by evaporation, percent | 63.9 |
| Demulsibility: | |
| 35 ml. of 0.02 N $CaCl_2$ | None |
| 50 ml. of 0.10 N $CaCl_2$ | None |
| Sieve test (retained on No. 20 Sieve), percent | 0.0 |
| Cement mixing test, percent | 4.5 |
| Test on residue of emulsion: | |
| Penetration 77° F., 100 g., 5 seconds | 35 |
| Ductility at 77° F., 5 cm./mon., CM, + | 150 |
| Solubility in $CCl_4$, percent | 99.58 |

EXAMPLE 3

*Preparation of composition and its application to pavement*

Concrete sand (3600 grams) passing through a number 10 sieve with 1% or less passing through a number 200 sieve and limestone dust (100 grams), Portland cement (100 grams) and titanium dioxide (100 grams) all passing through a number 200 sieve were placed in a laboratory agitator mixer and dry mixed for several minutes until thoroughly blended. Water (400 grams) was added to the blend and mixed for approximately one minute. Emulsion prepared in Example 2 (600 grams) was added to the blend and mixing was continued for about one additional minute to form the slurry composition of the present invention. The composition was then dumped upon an extensively cracked asphalt pavement in the driveway to a parking lot. The slurry composition was trowelled to evenly spread 1.5 pounds of composition per square foot of pavement. The air temperature at the time of application was 65° F. and the humidity was high as indicated by the presence of a light drizzle. The composition provided a white coating which effectively sealed the cracks in the pavement and provided a durable, smooth, light-reflecting surface having excellent pavement properties as compared to the pre-existing asphalt pavement.

EXAMPLE 4

*Preparation of resin and oil mixture*

Aromatic oil (48 parts by weight) consisting essentially of a mixture of highly viscous aromatic compounds and having a viscosity of 267.8 S.S.U. at 210° F. and an aniline point of 42° C., is slowly heated to about 200° F. Crumb styrene-butadiene rubber (4 parts by weight), described in Example 1, is added and the resulting mixture stirred at that temperature for several hours until the rubber dissolves in the oil. The blending apparatus is flushed with inert gas and maintained under a blanket of inert gas as described in Example 1. Crushed substantially completely polymerized synthetic aromatic thermoplastic hydrocarbon resin, softening point 242° F. (48 parts by weight) having a mixed aniline point of 31.8° C., an iodine number of 125, an acid number of 0, and a molecular weight range of 800–1200 as determined by cryoscopic means is added to the rubber and oil solution. The temperature is raised to about 240° F. and the mixture stirred for an additional hour until the resin is dissolved into solution.

EXAMPLE 5

*Preparation of an emulsion of resin and oil mixture*

Product of Example 4 (1708 grams) was stirred with a laboratory mechanical stirrer set at its slowest rate of speed. The product was slowly heated to and thereafter maintained at about 170° F. A nonionic surfactant, nonyl phenoxy polyoxyethylene ethanol (127 grams), and the sodium salt of an alkyl aryl polyether sulfonate (42.6 grams) were added into the heated mixture until a uniform mixture was obtained. Water (1180 grams) was slowly added at the temperature of the mixture with stirring. A water-in-resin and oil mixture emulsion was first formed which inverted to a resin and oil mixture-in-water emulsion as indicated by a change from a doughy to a milky consistency. After all the water had been added, the emulsion thus formed had a viscosity of 53 Krebs units, a solids content of 60.22% by weight, a density of 8.4 pounds per gallon and a pH of 7.3. The emulsion also had the following properties as determined by ASTM Method D–244–60 and AASHO Method T–59:

Furol viscosity at 77° F., seconds _____ 18.0
Settlement, 5 days, percent _____ 1.5
Residue by evaporation, percent _____ 60.2
Demulsibility:
  35 ml. of 0.02 N CaCl₂ _____ None
  50 ml. of 0.10 N CaCl₂ _____ None
Sieve test (retained on No. 20 Sieve), percent ___ 0.0
Tests on residue of emulsion:
  Penetration 77° F., 100 g., 5 seconds _____ 63
  Ductility at 77° F., 5 cm./min., CM, + ____ 150
  Solubility in CCl₄, percent _____ 99.74

EXAMPLE 6

*Preparation of composition and its application to pavement*

Concrete sand (3600 grams) passing through a number 10 sieve with 1% or less passing through a number 200 sieve, and limestone dust (200 grams), Portland cement (100 grams) and titanium dioxide (100 grams) all passing through a number 200 sieve, were placed in a laboratory agitator mixer and dry mixed for several minutes until thoroughly blended. Water (250 grams) was added to the blend and mixed for approximately one minute. Emulsion prepared in Example 5 (600 grams) was added to the blend and mixing was continued for a few additional minutes to form the composition of the present invention. The composition was dumped onto the spalling concrete surface of a driveway, and trowelled to a smooth surface of about ⅛ inch in depth. The coating was tack-free approximately 3 hours after application and was opened to traffic five hours after application. The coating provided a durable, white, smooth surface which effectively sealed the existing pavement from the seepage of moisture.

EXAMPLE 7

*Preparation of colored compositions*

A series of colored slurry compositions were prepared according to the procedure of Example 3 utilizing the ingredients in the stated proportions by weight listed below:

| | White | Red | Yellow | Green | Blue |
|---|---|---|---|---|---|
| Concrete sand [1] | 1,440 | 1,440 | 1,440 | 1,440 | 1,440 |
| Limestone dust [2] | 40 | 40 | 40 | 40 | 40 |
| Portland Cement [2] | 40 | 40 | 40 | 40 | 40 |
| Water | 150 | 150 | 150 | 150 | 150 |
| Titanium dioxide [2] | 40 | | | 5 | 5 |
| Molybdate orange [3] | | 40 | | | |
| Lead chromate [4] | | | 40 | | |
| Copper phthalocyanine [5] | | | | 1 | |
| Copper phthalocyanine [2] | | | | | 1 |
| Emulsion of Example 2 | 120 | 120 | 120 | 120 | 120 |

[1] Passing through number 10 sieve, 1% or less passing through number 200 sieve.
[2] Passing through number 200 sieve.
[3] Pigment composed of lead chromate, lead sulfate and lead molybdate, and passing through number 200 sieve.
[4] Lead chromate with small amount of lead sulfate and passing through number 200 sieve.
[5] Hydrogen atoms replaced with chlorine atoms and passing through number 200 sieve.

The slurry composition of the present invention prepared as described above had excellent properties and were suitable for use in sealing and coloring pavements.

The present invention provides coating compositions which, when applied to pavement, fills and seals the cracks and potholes therein, seals the pavement against the seepage of moisture, and provides a colored, light-reflecting surface having improved physical properties. These compositions can be used with old concrete pavements to revitalize the same and restore its smooth surface and wearing qualities. The composition can also be used to revitalize colored pavements, to restore the color and improve its surface qualities. However, the composition of the present invention is most advantageously used upon asphalt pavements, whether new or old, to seal the pavements against the seepage of moisture and to provide a colored, light-reflecting durable surface to the pavement having improved surface properties over the original asphalt surface.

We claim:
1. A coating slurry for sealing and coloring pavements, consisting essentially of:
(1) from about 140 to about 190 parts by weight of aggregate selected from the group consisting of sand, slag, crushed gravel and mixtures thereof, whose particles are less than about 10 mesh size;
(2) from about 1 to about 20 parts by weight of a solid alkaline material selected from the group consisting of Portland cement, hydrated lime, limestone dust and mixtures thereof, whose particles are less than about 200 mesh size;
(3) from about 2 to about 10 parts by weight light stable pigment whose particles are less than about 200 mesh size;
(4) from about 2 to about 25 parts by weight water; and
(5) from about 10 to about 40 parts by weight aqueous emulsion consisting essentially of:
(a) from about 45 to about 70 parts by weight of a mixture comprising from about 30 to about 70 percent by weight substantially completely polymerized aromatic, thermoplastic, petroleum-derived hydrocarbon resin, having a softening point range of from about 220° to about 300° F., a mixed aniline point of from about 20 to about 60° C., an iodine number of from about 40 to about 160, an acid number of from 0 to about 4, and a molecular weight of from about 600 to about 1700 as determined by cryoscopic means; and from about 30 to about 70 percent by weight oil selected from the group consisting of aromatic oil having a viscosity of from about 120 to about 300 S.S.U. at 210° F. and an aniline point of from about 20 to about 60° C., naphthenic oil consisting essentially of a mixture of viscous alicylic hydrocarbons having a viscosity of from about 40 to about 200 S.S.U. at 210° F. and an aniline point of from about 50 to about 150° C., and mixtures thereof;

(b) from about 2 to about 10 parts by weight emulsifier for the resin and oil mixture, said emulsifier selected from the group consisting of cationic, anionic and nonionic emulsifiers and anionic-nonionic emulsifier pairs; and (c) from about 20 to about 50 parts by weight water.

2. A coating slurry for sealing and coloring pavements, consisting essentially of:

(1) from about 140 to about 190 parts by weight of aggregate selected from the group consisting of sand, slag, crushed gravel and mixtures thereof, whose particles are less than about 10 mesh size;

(2) from about 1 to about 20 parts by weight of a solid alkaline material selected from the group consisting of Portland cement, hydrated lime, limestone dust and mixtures thereof, whose particles are less than about 200 mesh size;

(3) from about 2 to about 10 parts by weight light stable pigment whose particles are less than about 200 mesh size;

(4) from about 2 to about 25 parts by weight water; and (5) from about 10 to about 40 parts by weight aqueous emulsion consisting essentially of:

(a) from about 45 to about 70 parts by weight of a mixture comprising from about 1 to about 10 percent by weight hydrocarbon rubber; from about 30 to about 70 percent by weight substantially completely polymerized aromatic, thermoplastic petroleum-derived hydrocarbon resin, having a softening point range of from about 220° to about 300° F., a mixed aniline point of from about 20° to about 60° C., an iodine number of from about 40 to about 160, an acid number of from 0 to about 4, and a molecular weight of from about 600 to about 1700 as determined by cryoscopic means; and from about 30 to about 70 percent by weight oil selected from the group consisting of aromatic oil having a viscosity of from about 120 to about 300 S.S.U. at 210° F. and an aniline point of from about 20° to about 60° C., naphthenic oil consisting essentially of a mixture of viscous alicyclic hydrocarbons having a viscosity of from about 40 to about 200 S.S.U. at 210° F. and an aniline point of from about 50 to about 150° C., and mixtures thereof;

(b) from about 2 to about 10 parts by weight emulsifier for the rubber, resin and oil mixture, said emulsifier selected from the group consisting of cationic, anionic, and nonionic emulsifiers and anionic-nonionic emulsifier pairs; and (c) from about 20 to about 50 parts by weight water.

3. A method for sealing and coloring pavement which comprises applying to the surface of said pavement from about 1/16 to about 1 inch in depth of a coating composition consisting essentially of:

(1) from about 140 to about 190 parts by weight of aggregate selected from the group consisting of sand, slag, crushed gravel and mixtures thereof, whose particles are less than about 10 mesh size;

(2) from about 1 to about 20 parts by weight of a solid alkaline material selected from the group consisting of Portland cement, hydrated lime, limestone dust and mixtures thereof, whose particles are less than about 200 mesh size;

(3) from about 2 to about 10 parts by weight light stable pigment whose particles are less than about 200 mesh size;

(4) from about 2 to about 25 parts by weight water; and (5) from about 10 to about 40 parts by weight aqueous emulsion consisting essentially of:

(a) a mixture comprising from about 30 to about 70 parts by weight substantially completely polymerized thermoplastic petroleum-derived hydrocarbon resin having a softening point range of from about 220° to about 300° F., a mixed aniline point of from about 20° to about 60° C., an iodine number of from about 40 to about 160, an acid number of from 0 to about 4, and a molecular weight of from about 600 to about 1700 as determined by cryoscopic means; and from about 30 to about 70 parts by weight viscous oil selected from the group consisting of aromatic oil, naphthenic oil consisting essentially of a mixture of viscous alicyclic hydrocarbons, and mixtures thereof;

(b) an emulsifying quantity of emulsifier for the resin and viscous oil mixture, said emulsifier selected from the group consisting of cationic, anionic and nonionic emulsifiers and anionic-nonionic emulsifier pairs; and (c) from about 15 to about 75 percent by weight water based on the weight of resin and viscous oil mixture and emulsifier.

4. A method for sealing and coloring pavement which comprises applying to the surface of said pavement from about 1/16 to about 1 inch in thickness of a coating composition consisting essentially of:

(1) from about 140 to about 190 parts by weight of aggregate selected from the group consisting of sand, slag, crushed gravel and mixtures thereof, whose particles are less than about 10 mesh size;

(2) from about 1 to about 20 parts by weight of a solid alkaline material selected from the group consisting of Portland cement, hydrated lime, limestone dust and mixtures thereof, whose particles are less than about 200 mesh size;

(3) from about 2 to about 10 parts by weight light stable pigment whose particles are less than about 200 mesh size;

(4) from about 2 to about 25 parts by weight water; and (5) from about 10 to about 40 parts by weight aqueous emulsion consisting essentially of:

(a) from about 45 to about 70 parts by weight of a mixture comprising from about 1 to about 10 percent by weight hydrocarbon rubber; from about 30 to about 70 percent by weight substantially completely polymerized aromatic, thermoplastic, petroleum-derived hydrocarbon resin, having a softening point range of from about 220° to about 300° F., a mixed aniline point of from about 20 to about 60° C., an iodine number of from about 40 to about 160, an acid number of from 0 to about 4, and a molecular weight of from about 600 to about 1700 as determined by cryoscopic means; and from about 30 to about 70 percent by weight oil selected from the group consisting of aromatic oil having a viscosity of from about 120 to about 300 S.S.U. at 210° F. and an aniline point of from about 20° to about 60° C., naphthenic oil consisting essentially of a mixture of viscous alicyclic hydrocarbons having a viscosity of from about 40 to about 200 S.S.U. at 210° F. and an aniline point of from about 50 to about 150° C., and mixtures thereof;

(b) from about 2 to about 10 parts by weight emulsifier for the rubber, resin and oil mixture, said emulsifier selected from the group consisting of cationic, anionic, and nonionic emulsifiers and anionic-nonionic emulsifier pairs; and (c) from about 20 to about 50 parts by weight water.

5. A colored and sealed pavement which comprises a pavement and a veneer bound to the surface thereof, said veneer comprising the residue upon evaporation of a coating composition consisting essentially of:

(1) from about 140 to about 190 parts by weight of aggregate selected from the group consisting of sand, slag, crushed gravel and mixtures thereof, whose particles are less than 10 mesh size;

(2) from about 1 to about 20 parts by weight of a solid alkaline material selected from the group consisting of Portland cement, hydrated lime, limestone dust and mixtures thereof whose particles are less than about 200 mesh size;

(3) from about 2 to about 10 parts by weight light stable pigment whose particles are less than about 200 mesh size;

(4) from about 2 to about 25 parts by weight water; and (5) from about 10 to about 40 parts by weight aqueous emulsion consisting essentially of:

(a) from about 45 to about 70 parts by weight of a mixture of substantially completely polymerized thermoplastic petroleum-derived hydrocarbon resin having a softening point range of from about 220° to about 300° F., and from about 30 to about 70% by weight viscous oil selected from the group consisting of aromatic oil, naphthenic oil consisting essentially of a mixture of viscous alicyclic hydrocarbons, and mixtures thereof;

(b) from about 2 to about 10 parts by weight emulsifier for the resin and oil mixture, said emulsifier selected from the group consisting of cationic, anionic and nonionic emulsifiers and anionic-nonionic emulsifier pairs; and (c) from about 20 to about 50 parts by weight water.

References Cited by the Examiner

UNITED STATES PATENTS

| | | | |
|---|---|---|---|
| 2,662,064 | 12/1953 | Mead | 260—29.6 |
| 2,798,866 | 7/1957 | Gordon et al. | 260—80.5 |

FOREIGN PATENTS

| | | |
|---|---|---|
| 635,486 | 4/1950 | Great Britain. |
| 904,973 | 9/1962 | Great Britain. |

MURRAY TILLMAN, *Primary Examiner.*

J. L. WHITE, *Assistant Examiner.*